United States Patent
Zheng et al.

(10) Patent No.: US 10,957,030 B2
(45) Date of Patent: Mar. 23, 2021

(54) IMAGE CONDUCTION APPARATUS FOR SOLDERING INNER VOID ANALYSIS

(71) Applicant: INTERNATIONAL BUSINESS MACHINES CORPORATION, Armonk, NY (US)

(72) Inventors: Jiayu Zheng, Shenzhen (CN); Tao Song, Shenzhen (CN); Zexin Luo, Shenzhen (CN); WeiFeng Zhang, Shenzhen (CN); Lingle Guo, Shenzhen (CN); Mingman Li, Shenzhen (CN); Zhen Wang, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 16/103,178

(22) Filed: Aug. 14, 2018

(65) Prior Publication Data
US 2020/0058117 A1     Feb. 20, 2020

(51) Int. Cl.
*G06T 7/00* (2017.01)
*G02B 6/06* (2006.01)
(Continued)

(52) U.S. Cl.
CPC ............ *G06T 7/0004* (2013.01); *B23K 37/00* (2013.01); *G01N 21/8806* (2013.01); *G01N 21/95* (2013.01); *G02B 6/06* (2013.01); *G06T 2207/30141* (2013.01); *G06T 2207/30152* (2013.01)

(58) Field of Classification Search
CPC .. A61B 1/00163; G02B 23/24; G06T 7/0004; G06B 6/06
See application file for complete search history.

(56) References Cited

U.S. PATENT DOCUMENTS

| 2,992,956 A | 7/1961 | Bazinet, Jr. |
| 3,445,273 A | 5/1969 | Gallagher |

(Continued)

FOREIGN PATENT DOCUMENTS

| EP | 0416371 A2 | 8/1990 |
| JP | 2000114581 A | 4/2000 |
| WO | 2008040670 A1 | 10/2008 |

OTHER PUBLICATIONS

"A Comprehensive Guide to X-Ray Inspection", http://www.seamarkzm.com/Article.aspx?ColumnId=1001&Language=36&Terminal=41, Jun. 6, 2017, pp. 1-3.

(Continued)

*Primary Examiner* — John J Lee
(74) *Attorney, Agent, or Firm* — Tutunjian & Biteto, P.C.; Joseph Petrokaitis

(57) ABSTRACT

System and methods for solder void analysis with an optical inspection component are described, including a plurality of optical fibers longitudinally disposed through a glass tube such that ends of the optical fibers are exposed from corresponding ends of the glass tube. A solderable fill encompassing each of the optical fibers by filling spaces between each of the optical fibers and between the optical fibers and the glass tube such that the ends of the glass tube include the ends of the optical fibers surrounded by the solderable fill to form an interface around the optical fibers for soldering one of the ends of the glass tube to a solder pad.

20 Claims, 9 Drawing Sheets

(51) Int. Cl.
  *B23K 37/00* (2006.01)
  *G01N 21/95* (2006.01)
  *G01N 21/88* (2006.01)

(56) References Cited

U.S. PATENT DOCUMENTS

| | | | |
|---|---|---|---|
| 4,366,713 A | | 1/1983 | Gilmore et al. |
| 4,741,470 A | | 5/1988 | Winter et al. |
| 4,878,733 A | * | 11/1989 | Winter ................ G02B 6/4488 |
| | | | 385/102 |
| 5,455,870 A | | 10/1995 | Sepai et al. |
| 5,472,471 A | | 12/1995 | Baba et al. |
| 5,687,267 A | | 11/1997 | Uchida |
| 5,751,910 A | | 5/1998 | Bryant et al. |
| 6,092,394 A | * | 7/2000 | Backer ............. C03B 37/01211 |
| | | | 65/377 |
| 6,272,204 B1 | | 8/2001 | Amtower et al. |
| 7,072,503 B2 | | 7/2006 | Prince |
| 8,376,209 B2 | | 2/2013 | Choi et al. |
| 9,171,809 B2 | | 10/2015 | Lopez et al. |
| 2002/0153419 A1 | | 10/2002 | Hall |
| 2007/0289768 A1 | | 12/2007 | Moore et al. |
| 2008/0238086 A1 | | 10/2008 | Geuens et al. |
| 2008/0246164 A1 | | 10/2008 | Ueshima |
| 2010/0239157 A1 | | 9/2010 | O'Dell et al. |
| 2013/0070235 A1 | * | 3/2013 | Chen .................... G01L 11/025 |
| | | | 356/73 |
| 2016/0057869 A1 | | 2/2016 | Wei et al. |
| 2017/0066089 A1 | | 3/2017 | Maalekian et al. |
| 2018/0039062 A1 | * | 2/2018 | Yamada ............. A61B 1/00096 |

OTHER PUBLICATIONS

Lentz, "Fill the Void II: An Investigation into Method of Reducing Voiding", 2017 IPC Apex Expo Technical Conference, Feb. 2017, pp. 1-17.

* cited by examiner

```
┌─────────────────────────────────────────────────────────────────────┐
│ bundling optical fibers in a glass tube such that the optical fibers extend longitudinal │
│         from a first end of the glass tube to a second end of the glass tube         │
│                                    1001                                              │
└─────────────────────────────────────────────────────────────────────┘
                                      │
                                      ▼
┌─────────────────────────────────────────────────────────────────────┐
│    filling spaces in the glass tube and the bundle of optical fibers with a solderable │
│                                   powder                                             │
│                                    1002                                              │
└─────────────────────────────────────────────────────────────────────┘
                                      │
                                      ▼
┌─────────────────────────────────────────────────────────────────────┐
│              capping each of the first end and the second end with caps              │
│                                    1003                                              │
└─────────────────────────────────────────────────────────────────────┘
                                      │
                                      ▼
┌─────────────────────────────────────────────────────────────────────┐
│  heating the glass tube, the optical fibers and the solderable powder to a temperature │
│        above a melting temperature of the solderable powder to liquify the solderable │
│                                   powder                                             │
│                                    1004                                              │
└─────────────────────────────────────────────────────────────────────┘
                                      │
                                      ▼
┌─────────────────────────────────────────────────────────────────────┐
│       cooling the glass tube, the optical fibers and the liquified solderable powder to │
│    solidify the solderable powder to form a solderable fill encompassing each of the │
│ optical fibers and filling the glass tube such that the solderable fill forms an interface │
│  around the optical fibers for soldering one of the first end or the second end of the │
│                          glass tube to the solder pad                                │
│                                    1005                                              │
└─────────────────────────────────────────────────────────────────────┘
                                      │
                                      ▼
┌─────────────────────────────────────────────────────────────────────┐
│        removing the caps to expose ends of the optical fibers and the solderable fill │
│                                    1006                                              │
└─────────────────────────────────────────────────────────────────────┘
```

FIG. 11 soldering a dummy component to a solder pad of a PCB with a layer of solder, the dummy component including a plurality of optical fibers longitudinally disposed through a glass tube such that ends of the optical fibers are exposed from corresponding ends of the glass tube and a solderable fill encompassing each of the optical fibers and filling the glass tube such that the solderable fill forms an interface around the optical fibers for soldering one of the ends of the glass tube to a solder pad.
1101

↓ positioning an imaging device over an end of the dummy component opposite to the PCB
1102

↓ capturing images of the layer of solder communicated through the optical fibers of the dummy component using the imaging device
1103

↓ communicating the images to a display
1104

FIG. 12

IMAGE CONDUCTION APPARATUS FOR SOLDERING INNER VOID ANALYSIS

BACKGROUND

Technical Field

The present invention generally relates to soldering void analysis, and more particularly to an image conduction apparatus for soldering inner void analysis.

Description of the Related Art

Solder can often be used to attach devices together with an electrical connection. For example, semiconductor devices, such as, e.g., bottom termination components (BTC) can be soldered to a printed circuit board (PCB). However, when soldering, e.g., BTCs to a PCB, there is a risk of voids forming in the solder layer between a BTC and the PCB. Moreover, once the BTC is in place, the solder is between two devices, and thus cannot be inspected without the use of expensive X-ray techniques. As a result, it is unclear when and how these voids form. Thus, there can be no prediction or mitigation of voiding in a solder layer because the mechanism for void generation is unknown.

SUMMARY

In accordance with an embodiment of the present invention, an optical inspection component for solder void analysis is described. The optical inspection component includes a plurality of optical fibers longitudinally disposed through a glass tube such that ends of the optical fibers are exposed from corresponding ends of the glass tube. A solderable fill encompassing each of the optical fibers by filling spaces between each of the optical fibers and between the optical fibers and the glass tube such that the ends of the glass tube include the ends of the optical fibers surrounded by the solderable fill to form an interface around the optical fibers for soldering one of the ends of the glass tube to a solder pad.

In accordance with another embodiment of the present invention, a solder void analysis system including an optical inspection component is described. The system includes an optical inspection component soldered to a solder pad of a printed circuit board with a layer of solder. The optical inspection component includes a plurality of optical fibers longitudinally disposed through a glass tube such that ends of the optical fibers are exposed from corresponding ends of the glass tube and a solderable fill encompassing each of the optical fibers by filling spaces between each of the optical fibers and between the optical fibers and the glass tube such that the ends of the glass tube include the ends of the optical fibers surrounded by the solderable fill to form an interface around the optical fibers for soldering one of the ends of the glass tube to a solder pad. An imaging device is disposed over an end of the optical inspection component opposite to the solder pad such that the imaging device captures images of the layer of solder communicated through the optical fibers of the optical inspection component.

In accordance with another embodiment of the present invention, a method for forming an optical inspection component for solder void analysis is described. The method includes bundling optical fibers in a glass tube such that the optical fibers extend longitudinal from a first end of the glass tube to a second end of the glass tube. Spaces in the glass tube and the bundle of optical fibers are filled with a solderable powder. Each of the first end and the second end are capped with caps. The glass tube, the optical fibers and the solderable powder are heated to a temperature above a melting temperature of the solderable powder to liquify the solderable powder. The glass tube, the optical fibers and the liquified solderable powder are cooled to solidify the solderable powder to form a solderable fill encompassing each of the optical fibers and filling the glass tube such that the solderable fill forms an interface around the optical fibers for soldering one of the first end or the second end of the glass tube to the solder pad. The caps are removed to expose ends of the optical fibers and the solderable fill.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 11 is a block/flow diagram showing a system/method for forming a transparent optical inspection component, in accordance with an embodiment of the present invention; and FIG. 12 is a block/flow diagram showing a system/method inspecting and analyzing a solder layer between an optical inspection component and a PCB, in accordance with an embodiment of the present invention.

DETAILED DESCRIPTION

Figure 1:
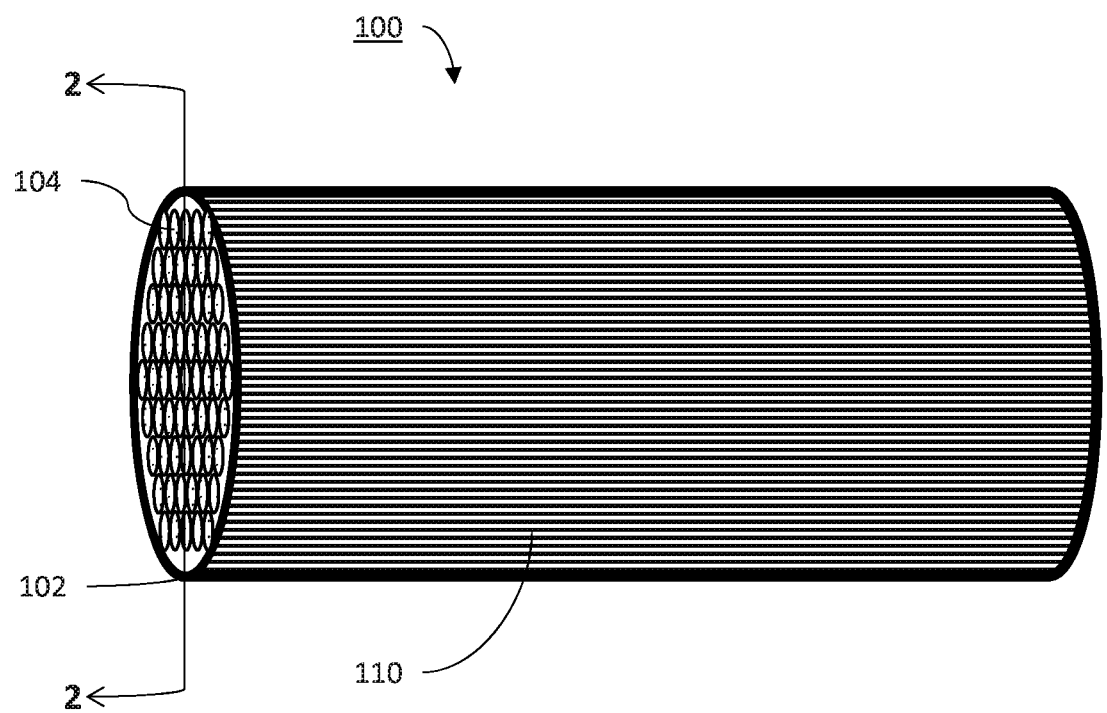
FIG. 1 is a perspective view a fiber bundle having optical fibers disposed in a sleeve, in accordance with an embodiment of the present invention.

According to an embodiment of the present invention, a system and method for inspecting solder layers with a camera, e.g., a charge coupled device (CCD) camera, is described that facilitates the imaging and study of solder layers.

In at least one possible embodiment of the present invention, a dummy bottom termination component (BTC) is formed of glass fibers. The glass fibers are bundled together in a fiber bundle, e.g., within a sleeve. The glass fibers of the fiber bundle can be enveloped by a solderable metal, such as, e.g., tin (Sn). The metal enveloping the glass fibers provides a portion of the fiber bundle that can be soldered to other components.

The fiber bundle is formed in a size corresponding to a BTC to form a transparent imitation of the BTC. However, the glass fibers have poor solderability. The metal in the fiber bundle facilitates soldering the fiber bundle to a printed circuit board (PCB). Thus, the fiber bundle is fixed to the PCB, providing a transparent inspection device that is soldered to the PCB such that the inspection device can provide a view of material between the inspection device and the PCB, such as, e.g., a solder layer. The fiber bundle is not only transparent, but also has a focal length of zero. Accordingly, the fiber bundle can provide a clear view of materials contacting an end of the fiber bundle. The solder layer and any voids formed therein can, therefore, be inspected with a CCD camera, or other imaging device. Thus, the transparent inspection device facilitates inspection and analysis of solder void generation so that the underlying mechanisms generating the solder voids can be better determined.

Exemplary applications/uses to which the present invention can be applied include, but are not limited to: visual inspection of soldered connections, including voids in solder layers.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an optical component that mimics an integrated circuit chip, which can be created in a graphical computer programming language, and stored in a computer storage medium (such as a disk, tape, physical hard drive, or virtual hard drive such as in a storage access network).

It should also be understood that material compounds will be described in terms of listed elements, e.g., Cu, Zn. These compounds include different proportions of the elements within the compound, e.g., CuZn includes $Cu_xZn_{1-x}$ where x is less than or equal to 1, etc. In addition, other elements can be included in the compound and still function in accordance with the present principles. The compounds with additional elements will be referred to herein as alloys.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, an isometric view a fiber bundle having optical fibers disposed in a sleeve is depicted in accordance with an illustrative embodiment of the present invention.

According to an embodiment of the present invention, a device for communicating images is described. Viewing an image of an adhesive layer, such as, e.g., a solder layer, can be facilitated by an optical device that can communicate the image from an interface between the optical device and the adhesive layer. Thus, a device that has a focal length of zero can enhance imaging of the interface. Accordingly, at least one embodiment of the present invention includes a fiber bundle 100 to convey optical light in the form of an image. Accordingly, multiple optical fibers 104 are grouped in the fiber bundle 100.

Each of the optical fibers 104 is formed as e.g., a fiber monofilament or a core with a cladding. In one embodiment, the optical fibers 104 each include a glass core with a cladding surrounding the core. The cladding has a lower index of refraction than the glass core, and thus light is confined to the core of the optical fiber 104 through internal reflection. Additionally, the optical fibers 104 can be any suitable fiber for communicating optical light. As such, the optical fibers 104 can include, e.g., single mode or multimode fibers, and can include, e.g., an optically transparent material, such as, e.g., glass or plastic. According to at least one embodiment of the present invention, the optical fibers 104 are multi-mode fibers suitable for carrying a portion of an image. Accordingly, the combination of more than one of the optical fibers 104 communicates a larger portion of an image than a particular optical fiber 104. Therefore, images on one end can be viewed from the opposite end. Each optical fiber 104 can communicate a portion of the image with a focal of length as short as zero. Thus, the fiber bundle 100 can communicate the image according to a portion communicated by each individual optical fiber 104.

However, according to aspects of the present invention, an arrangement for maintaining the optical fibers 104 in the fiber bundle 100 can be facilitated with a tube 102. The tube 102 can be, e.g., a cylinder with a circular cross-section, however, other shaped cross-sections for tubes are contemplated, such as, e.g., a rectangle, square, ellipse, triangle, or any other shape. Additionally, to facilitate communicating light through the optical fibers 104, the tube 102 can have open ends such that ends of each of the optical fibers 104 are contained within a sidewall 110 and exposed to an outside of the tube 102 through the ends. Accordingly, the tube 102 maintains the optical fiber 102 in a fiber bundle 100.

The optical fibers 104 can be arranged within the tube 102 in a regular or predetermined manner, such as, e.g., held in an evenly spaced manner. According to one possible embodiment, the optical fibers 104 are held within the tube 102 in, e.g., a hexagonal arrangement of rows and columns, or a square or circular arrangement, among others. However, other arrangements are contemplated. For example, the optical fibers 104 can be randomly arranged, being held in an arrangement through the support of adjacent optical fibers 104 and walls 110 of the tube 102. Regardless of the arrangement, the optical fibers 104 can be provided in any density within the fiber bundle 100. For example, the optical fibers 104 can have such a density to cause every optical fiber 104 to be in contact with surrounding optical fibers 104, and in contact with the tube 102. However, any other lower density is possible such that space is provided between the optical fibers 104 to facilitate filling the space with another material, as will be described below.

Moreover, the tube 102 having a same coefficient of thermal expansion and same melting temperature as the optical fibers 104 can ensure that later processing is more reliable and precise. Thus, the tube 102 can be made of a material that is, e.g., the same as a material of the optical fibers 104. For example, both the optical fibers 104 and the tube 102 can be made of a same type of glass or plastic.

Figure 2:
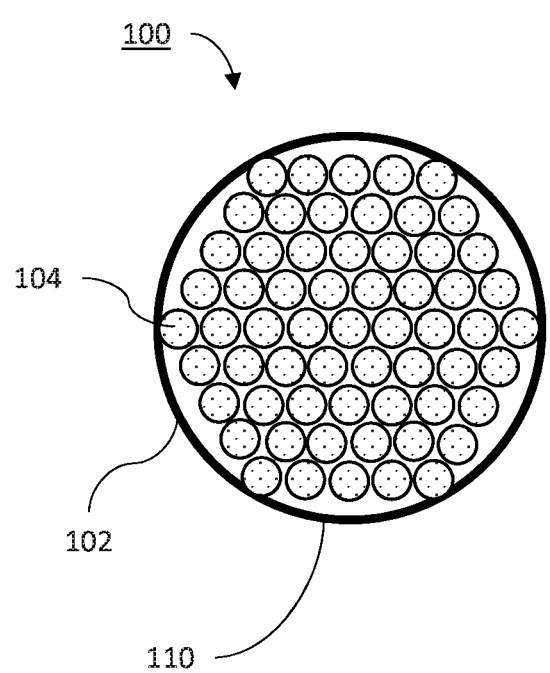
FIG. 2 is a cross-sectional view of cross-section 2-2 of FIG. 1 showing the fiber bundle having the optical fibers disposed in the sleeve, in accordance with an embodiment of the present invention.

Referring now to FIG. 2, a cross-sectional view of cross-section 2-2 of FIG. 1 showing the fiber bundle having the optical fibers disposed in the sleeve is depicted in accordance with an illustrative embodiment of the present invention.

As described above, the tube 102 can contain a number of optical fibers 104 to form a fiber bundle 100. The optical fibers 104 can be held within the tube 104 in any arrangement. For example, the optical fibers 104 may be arranged in a hexagonal pattern, though any pattern can be used or the optical fibers 104 can be loosely arranged within the tube 102 such that there is no pattern.

Figure 3:
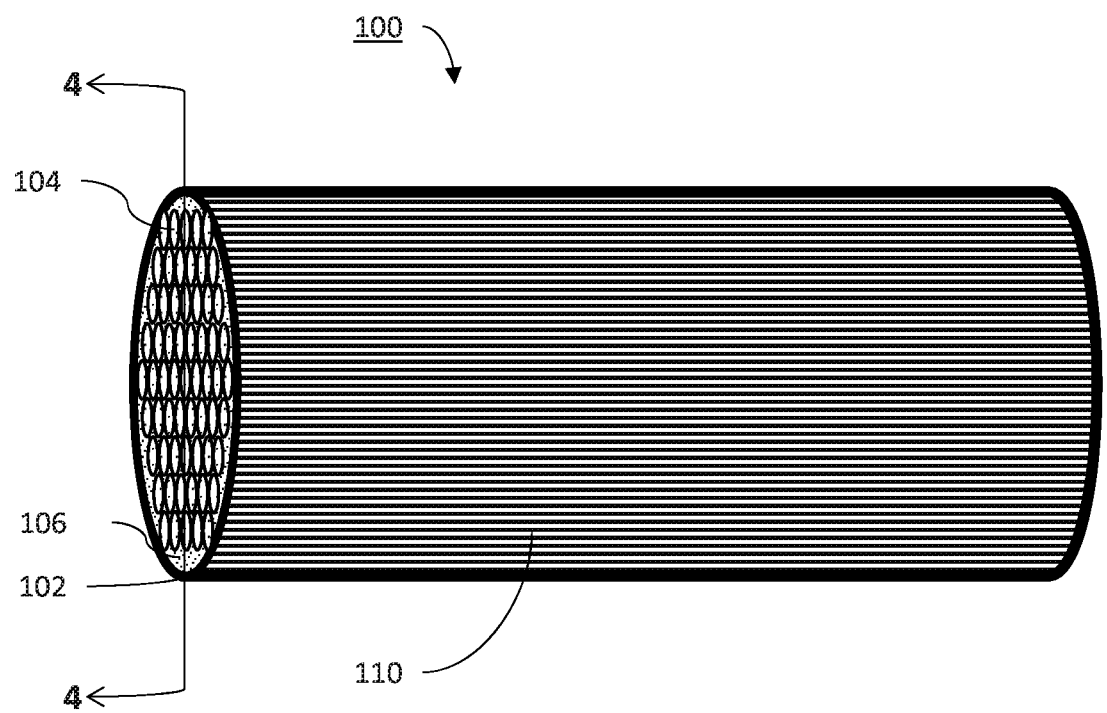
FIG. 3 is a perspective view showing a fiber bundle having optical fibers disposed in a sleeve with an solderable material filling gaps within the sleeve, in accordance with an embodiment of the present invention.

Referring now to FIG. 3, an isometric view showing a fiber bundle having optical fibers disposed in a sleeve with an solderable material filling gaps within the sleeve is depicted in accordance with an illustrative embodiment of the present invention.

According to an embodiment of the present invention, the fiber bundle 100 includes space between each of the optical fibers 104 and the tube 102. The optical fibers 104 and the tube 102 are not solderable material because the materials of each the optical fibers 104 and the tube 102 are smooth to permit an optical signal to communicate through the ends. Thus, the space can be filled with a solderable material 106, such as, e.g., tin (Sn), lead (Pb), copper (Cu), silver (Ag), gold (Au), antimony (Sb) or other solderable material 106 and alloys thereof. According to aspects of the present invention, the solderable material 106 includes a material that has a melting temperature below that of the material of each of the optical fibers 104 and the tube 102.

The space between each optical fiber 104 is sized to provide an amount of solderable material 106 that facilitates secure soldering of the fiber bundle 100 to another part, such as, e.g., a printed circuit board (PCB). Thus, the space between each optical fiber 104 can be of any suitable size, such as, e.g., a width between adjacent optical fibers 104 that is about 20 percent the diameter of the optical fibers 104, or the surface at a cross section having an area that is about 20 percent of the surface area of the optical fibers 104, tube 102 and solderable material 106 together at the cross section, among other possible sizes. The size of the spaces for accommodating the solderable material 106 can be formed by providing a fixed and regular arrangement of optical fibers 104 before filling the spaces with the solderable material 106. Alternatively, the optical fibers 104 can be provided in a random arrangement whereby the spaces between each optical fiber 104 represents an average space according to a density of optical fibers 104 within the fiber bundle 100.

To fill the space between each of the optical fibers 104 within the tube 102, the solderable material 106 can be introduced into the tube 102 as, e.g., a powder, paste or liquid. By introducing a powder into the tube 102, all of the crevices and gaps that form spaces within the tube 102 around the optical fibers 104 can be easily filled without gaps or bubbles. Any existing gaps in within the solderable material 104 can be filled by, e.g., shaking or vibrating the fiber bundle 100 to cause the powdered or paste solderable material 106 to settle. Thus, the solderable material 106 can be introduced into the spaces in the fiber bundle 100, such as spaces between each optical fiber 104 and between the optical fibers 104 and the tube 102, without gaps.

Figure 4:
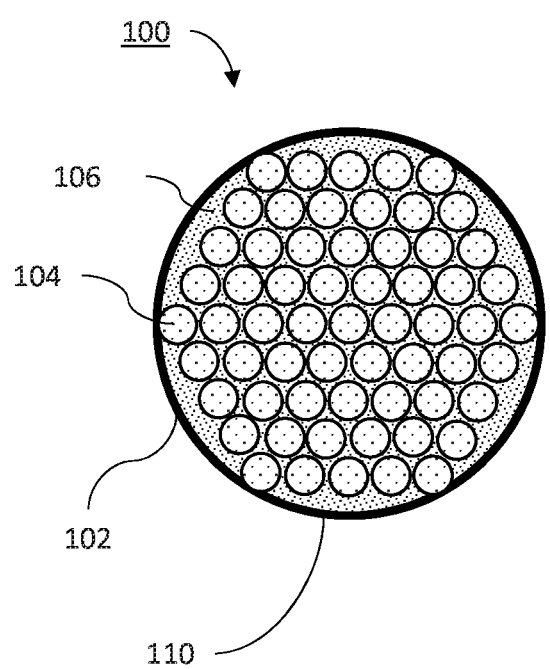
FIG. 4 is a cross-sectional view of cross-section 4-4 of FIG. 3 showing the fiber bundle having the optical fibers disposed in the sleeve with the solderable material filling gaps within the sleeve, in accordance with an embodiment of the present invention.

Referring now to FIG. 4, a cross-sectional view of cross-section 4-4 of FIG. 3 showing the fiber bundle having the optical fibers disposed in the sleeve with the solderable material filling gaps within the sleeve is depicted in accordance with an illustrative embodiment of the present invention.

As described above, the solderable material 106 can fill spaces and gaps within the tube 102 around the optical fibers 104. Thus, the optical fibers 104 are encompassed by the solderable material 106 and the tube 102 is entirely filled.

Figure 5:
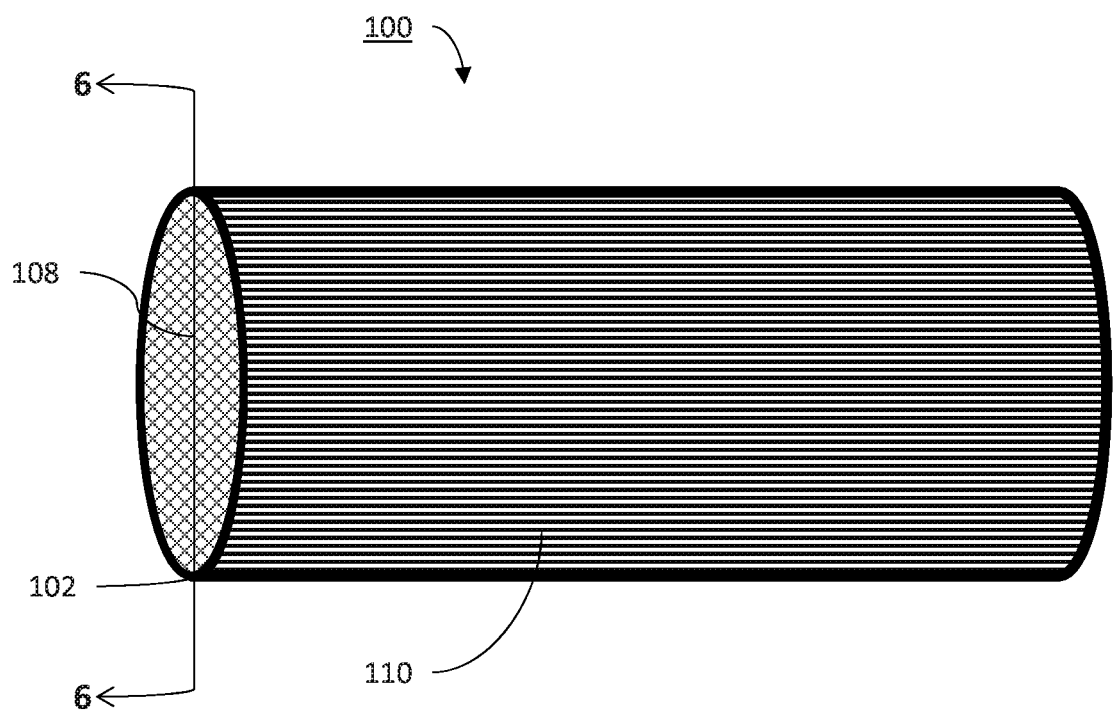
FIG. 5 is a perspective showing a fiber bundle having a sleeve with a temporary cap disposed on ends thereof for containing optical fibers and an solderable material, in accordance with an embodiment of the present invention.

Referring now to FIG. 5, an isometric view showing a fiber bundle having a sleeve with a temporary cap disposed on ends thereof for containing optical fibers and an solderable material is depicted in accordance with an illustrative embodiment of the present invention.

The tube 102, having been filled with solderable material 106 to encompass each of the optical fibers 104 arranged therein, can be temporarily closed on each end with caps 108. The caps 108 can be any suitable material for plugging the ends of the tube 102 for subsequent processing, such as, e.g., plastic, metal, resin, epoxy, or any other suitable material. Thus, the solderable material 106 and the optical fibers 104 are confined within the tube 102 in a fixed arrangement.

According to aspects of the present invention, the fiber bundle 100 can be heated to a temperature that melts the solderable material 106. Upon heating, the solderable material 106 liquifies and is cooled to solidify as a single solderable fill 112 (shown in FIG. 7) from the solderable material 106 around the optical fibers 104. Thus, according to aspects of the present invention, the solderable material 106 has a melting temperature that is lower than that of the tube 102, the optical fibers 104 and the caps 108 so as not to deform or damage any of the tube 102, the optical fibers 104 and the caps 108. Because the glass of the optical fibers 104 and the tube 102 has a melting temperature of about 1800° Celsius (° C.), the solderable material can be, e.g., Sn, Cu, Ag, Au or other metal that melts at a temperature below 1800° C. The caps 108 can be formed of any material that has a melting temperature of at least 1800° C. so as not to deform, such as, e.g., glass or other material. Thus, the solderable material 106 can be held in place within the tube 102 to melt and solidify around the optical fibers, forming a solid fiber bundle 100.

Figure 6:
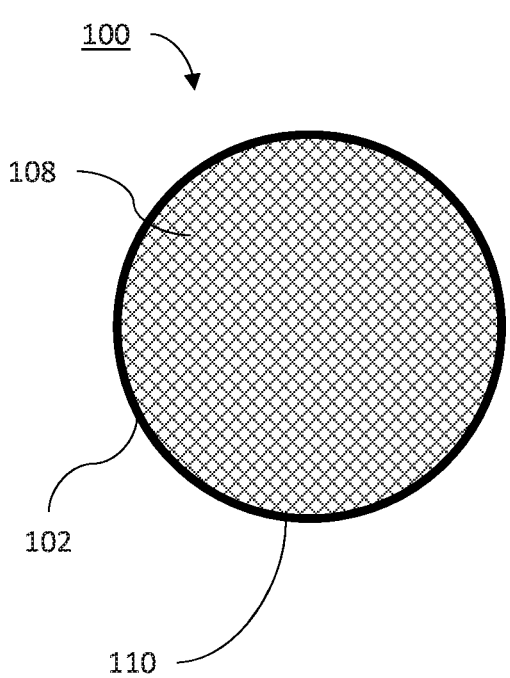
FIG. 6 is a cross-sectional view of cross-section 6-6 of FIG. 5 showing the fiber bundle having the sleeve having the temporary cap disposed on ends thereof for containing the optical fibers and the solderable material, in accordance with an embodiment of the present invention.

Referring now to FIG. 6, a cross-sectional view of cross-section 6-6 of FIG. 5 showing the fiber bundle having the sleeve having the temporary cap disposed on ends thereof for containing the optical fibers and the solderable material is depicted in accordance with an illustrative embodiment of the present invention.

As described above, the cap 108 plugs each end of the tube 102 such that none of the optical fibers 104 or solderable material 106 is exposed to an exterior of the tube 102. Thus, the optical fibers 104 and the solderable material 106 are confined within the tube 102.

Figure 7:
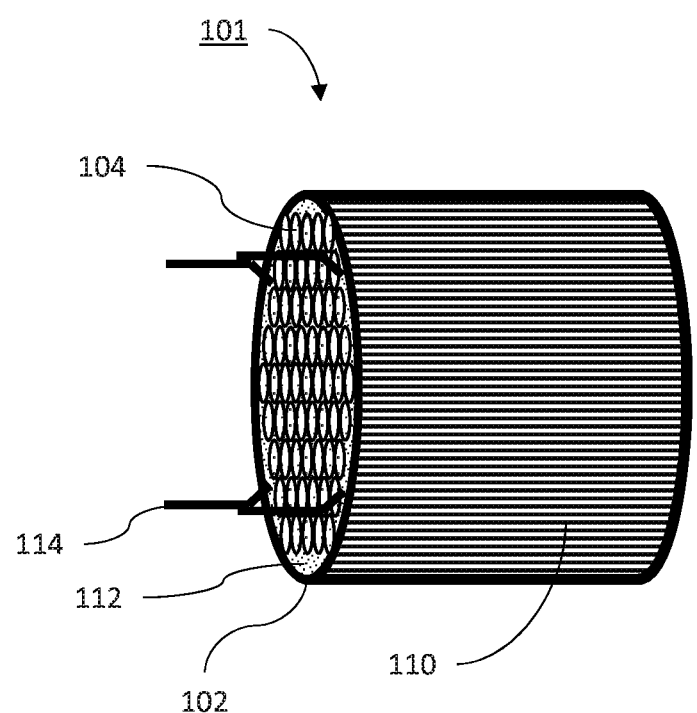
FIG. 7 is a cross-sectional view showing an optical inspection component with optical fibers disposed within a sleeve having an solderable material filling gaps therein, in accordance with an embodiment of the present invention.

Referring now to FIG. 7, a cross-sectional view showing an optical inspection component with optical fibers disposed within a sleeve having an solderable material filling gaps therein is depicted in accordance with an illustrative embodiment of the present invention.

The fiber bundle 100 including the tube 102, optical fibers 104 and the solderable fill 112, can be sized to have a form that mimics an actual component, such as, e.g., such as, e.g., a central processing unit (CPU), a memory device, a storage device, a circuit component, or any other solderable component. Thus, the resulting optical inspection component 101 can be attached to a printed circuit board (PCB) in a location corresponding to the actual device being mimicked.

To achieve the selected size, the fiber bundle 100 can be, e.g., longitudinally drawn out to a selected diameter. For example, the fiber bundle 100 can be hung vertically such that each optical fiber 104 and the glass tube 102 hang parallel to each other length-wise, with an end of the fiber bundle 100 being held at a first vertical position, and a second end of the fiber bundle 100 hanging at a second vertical position directly beneath the first vertical position. The fiber bundle 100 is then heated until the tube 102 and the optical fibers 104 become plastic. While in the plastic state, the tube 102 and the optical fibers 104 can be, e.g., pulled by, e.g., a person, a machine, gravity or other method. As the fiber bundle 100 in pulled, the fiber bundle 100 also becomes more narrow, thus shrinking the diameter of the fiber bundle 100. Accordingly, the fiber bundle 100 can be drawn until a desired diameter is attained.

Because the solderable material 106 within the tube 102 has a lower melting temperature compared to the material of the tube 102 and the optical fibers 104, a heating temperature for drawing the fiber bundle 100 can be selected that is in between the melting temperature of the solderable material 106 and the temperature for plasticity of the tube 102 and the optical fibers 104. As a result, as the fiber bundle 100 is drawn, the solderable material 106 is a liquid state such that the solderable material 106 continues to encompass the optical fibers 104, completely filling the tube 102. The fiber bundle 100 can be drawn from a diameter in a range of between about 1 millimeter (mm) and about 20 mm down to a final diameter in a range of about 0.03 mm to about 1 mm.

The fiber bundle 100 can also be shaped by material removal to achieve a desired length and cross-sectional shape for viewing a solder interface at a given area. For example, the fiber bundle 100 can be, e.g., cut or ground to shape a cross-section of the fiber bundle 100 such that the optical inspection component 101 has a cross-section shape and corresponding footprint similar to a component such as, e.g., a CPU, memory device, storage device, or other solderable device.

Additionally, the fiber bundle 100 can be cut to a desired length, such as a length in a range of between about 0.5 centimeters (cm) and about 10 cm. Other lengths are contemplated such that the resulting optical inspection component 101 can communicate an image of a solder interface. Upon cutting the fiber bundle 100, ends of the optical inspection component 101 can be ground smooth and/or polished to ensure a low diffraction and optically transparent end of each optical fiber 104 to improve optical transmission such that the optical inspection component can communicate the image from one end to the other end.

The optical inspection component 101 can be combined with other optical components to facilitate inspection and imaging. For example, additional lenses can be added to an end of the optical inspection component 101 to adjust magnification. Alternatively, an end of the optical inspection component 101 can be shaped to adjust magnification. Other possible additional components can include, e.g., a light source to provide light to a sample being inspected, an additional fiber optic capable to communicate an image from the optical inspection component to an imaging device, an imaging device that is attached directly to an end of the optical inspection component 101 to receive an image of the sample being inspected, or any other suitable components for optical inspection. Additionally, the additional components can be connected to the optical inspection component 101 by, e.g., holding the component in-place against the optical inspection component 101 with a suitable clamp or vice, adhering the component to the end of the optical device 101 using an index matched adhesive, interposing an index matching gel between the optical device 101 and the component to ensure efficient optical communication and minimize diffraction, among other connection methods.

To facilitate connecting the optical inspection component 101 to a PCB, the optical inspection component 101 can be formed with connection structures that would be an actual component that the optical inspection component 101 is mimicking. For example, some components connect to PCBs with metal pins that are accepted into corresponding vias in the PCB. The optical inspection component 101 can be formed with similar pins 114 that can be accepted into those same vias of the PCB. The pins 114 can be integrally formed with the solderable fill 112 during shaping of the end of the optical inspection component 101, or can be separately attached to the solderable fill 112 or the glass tube 102 so long as the pins 114 do not occlude any of the optical fibers 104.

Figure 8:
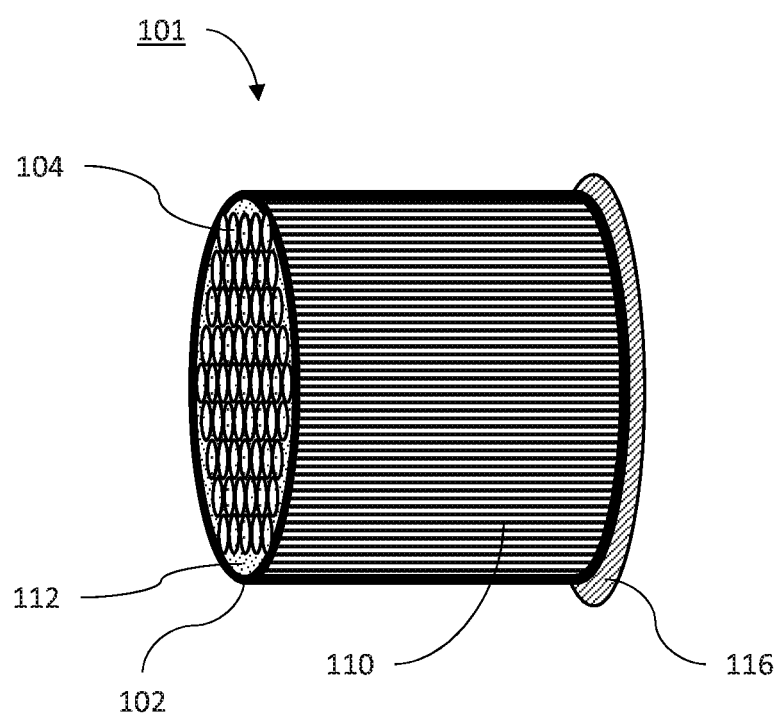
FIG. 8 is a cross-sectional view showing an optical inspection component with optical fibers disposed within a sleeve having an solderable material filling gaps therein and an attachment layer on an end of the optical inspection component, in accordance with an embodiment of the present invention.

Referring now to FIG. 8, a cross-sectional view showing an optical inspection component with optical fibers disposed within a sleeve having an solderable material filling gaps therein and an attachment layer on an end of the optical inspection component is depicted in accordance with an illustrative embodiment of the present invention.

According to an embodiment of the present invention, the optical inspection component 101 can include an attachment layer 116 on an end of the optical inspection component 101. For example, because the optical inspection component 101 can be soldered to a PCB, the optical inspection component 101 can include a layer of solder formed thereon. The solder layer can be formed as a uniform layer over an end of the optical inspection component 101 and solidified to form a component that is pre-prepared to attached to a PCB.

As another example, the attachment layer 116 can be, e.g., an adapter that has a shape of a component to be attached to a solder pad of a PCB, such as, e.g., a memory device, a processor, or other component. Thus, the attachment layer 116 can be a solderable layer that is formed on one side to attach to the optical inspection component 101. As such, the attachment layer 116 can include, e.g., a lip, a bevel, alignment marks, texturing, or other features that facilitate attachment to an end of the optical inspection component 101. A second side of the attachment layer 116 can include, e.g., a solderable surface that is shaped to match a solder pad of a PCB to facilitate the optical inspection component 101 mimicking an actual component. Because, the optical inspection component 101 communicates an image of a solder layer on a solder pad to inspect voids in the solder, the attachment layer 116 does not cover or otherwise occlude the optical fibers 104 of the optical inspection component 101. As such, the attachment layer 116 can include, e.g., perforations corresponding to end of the optical fibers 104 such that the optical fibers 104 can receive light through the attachment layer 116. Alternatively or in addition, the attachment layer 116 can be formed on a rim of the tube 102 around a periphery thereof such that the attachment layer 116 does not cover the optical fibers 104. Thus, the attachment layer 116 can include a hole through which the optical fibers 104 can receive light.

Similarly, the attachment layer 116 can be a similar attachment mechanism for attaching the optical inspection component 101 to another component, such as, e.g., a camera or microscope. Thus, the attachment layer 116 can form an adapter between the optical inspection component 101 and the other component that attaching the optical inspection component 101 to the other component with, e.g., threads, clamps, snap fitting, or other fastening device.

Figure 9:
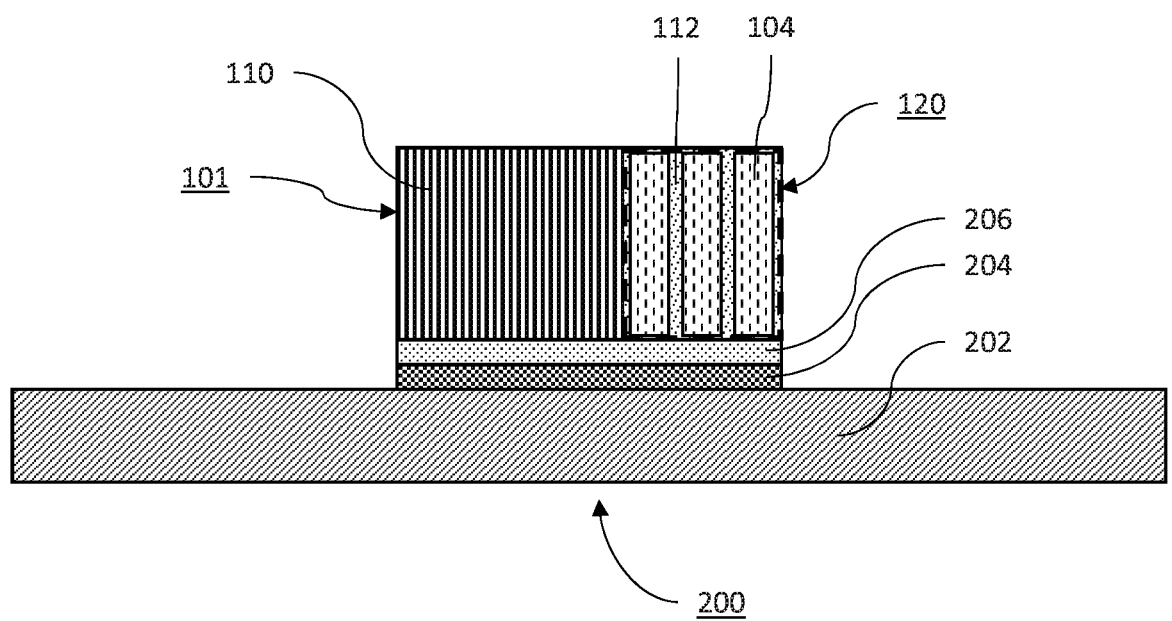
FIG. 9 is a cross-sectional view showing an optical inspection component attached to a solder pad of a PCB, in accordance with an embodiment of the present invention.

Referring now to FIG. 9, a cross-sectional view showing an optical inspection component attached to a solder pad of a PCB is depicted in accordance with an illustrative embodiment of the present invention.

A PCB 200 to be inspected can include a substrate 202 and a solder pad 204. The solder pad 204 can have a shape on a top surface of the substrate 202 corresponding to a particular type of component, such as those described above. Therefore, the solder pad 204 can be, e.g., a square pad, a rectangular pad, or any other suitable shape pad. The solder pad 204 can also be formed in a trench in the top surface of the substrate 202 such that the solder pad is embedded within the substrate 202.

The substrate 202 a suitable semiconductor or dielectric material for supporting the solder pad 204 and components attached thereto. The PCB 200 can include multiple solder pads 204 on a single substrate 202 such that the PCB 200 accepts multiple of the same or different components. Therefore, the substrate 202 can include connections that connect one solder pad 204 to another. These connections can be, e.g., embedded within the substrate 202, formed on a top surface of the substrate 202, or formed on a bottom surface opposite to the solder pad 204 and connecting to the solder pad 204 through vias extending through the substrate 202. Other configurations are contemplated for forming a PCB 200.

The optical inspection component 101 can be attached to the solder pad 204 using a layer of solder 206. The layer of solder 206 can adhere to the solder pad 204 as well as the solderable fill 112 within the optical inspection component 101. In one possible embodiment, the solderable fill 112 fills space between each optical fiber 104 within the optical inspection component 101. Thus, the solderable fill 112 forms a surface around an end of each of the optical fibers 104 to which the layer of solder 206 can adhere. The larger the surface between each optical fiber 104, the stronger the solder connection. However, a large surface also interferes with a proportion of the layer of solder 206 that is visible through the optical fibers 104. Therefore, the space between each optical fiber 104 is sized to provide a strong bond to the layer of solder 206 while still providing a clear view of the layer of solder 206 through the optical fibers 104. Thus, the space between each optical fiber 104 can be of any suitable size, such as, e.g., a width between adjacent optical fibers 104 that is about 20 percent the diameter of the optical fibers 104, or the surface having an area that is about 20 percent of the surface area of the optical inspection component 101, among other possible sizes. The size of the spaces for accommodating the solderable fill 112 can be formed by providing a fixed and regular arrangement of optical fibers 104 before filling the spaces with the solderable fill 112. Alternatively, the optical fibers 104 can be provided in a random arrangement whereby the spaces between each optical fiber 104 represents an average space according to a density of optical fibers 104 within the optical inspection component 101. In this way, the optical inspection component 101 can be soldered to the solder pad 204 despite an inability of the optical fibers 104 to be soldered.

The optical inspection component 101 can has a size and shape corresponding to an actual component that the solder pad 204 is configured to accept. For example, the solder pad 204 can have a size and connections corresponding to a type of CPU. In such a case, the optical inspection component 101 can have a similar footprint to the type of CPU such that and end of the optical inspection component 101, including exposed ends of the optical fibers 104 as discussed above, covers and area over the solder pad 204 that the type of CPU would cover. Thus, the optical inspection component 101 mimics the actual component during the soldering process such that the solder 206 is applied under similar conditions to conditions of soldering an actual component to the solder pad 204, including, e.g., conditions causing voids in the solder 206.

Because exposed ends of the optical fibers 104 are attached to the solder pad 204, the optical fibers 104 vertically from the end of the optical inspection component 101 in contact with the solder 206 and the solder pad 204 to an opposite end of the optical inspection component 101 opposite to the solder pad 204, as shown via the cut-out 120. Thus, the optical inspection component 101 communicates an image from a PCB side of the optical inspection component 101 to an opposite side through optical fibers 104 extending longitudinally therebetween. As a result, due to the zero focal length of optical fibers 104, the optical inspection component 101 provides a transparent aperture over the solder pad 204.

The solder 206 can be applied to the solder pad 204 or the optical inspection component 101. The optical inspection component 101 can then be brought into contact with the solder pad 204 such that the solder layer 206 is disposed between the optical inspection component 101 and the solder pad 204. The solder 206 can then cool and harden to bond the optical inspection component 101 to the solder pad 206. However, because the optical fibers 104 are made of a non-solderable material, such as, e.g., glass, the optical fibers 104 do not adhere to the solder pad 204. Rather, the solderable fill 112 that fills the tube 102 and encompasses the optical fibers 104 of the optical inspection component 101 provides a rough surface with the solder 206 adheres. Thus, the optical inspection component 101 is attached to the solder pad 204 via the solder 206 and solderable fill 112 such that the optical fibers 104 are adjacent to the layer of solder 206. The optical fibers 104 of the optical inspection component 101 can thus communicate an image from an interface between the end of the optical inspection component 101 at an interface with the solder 206 to the opposite end.

Figure 10:
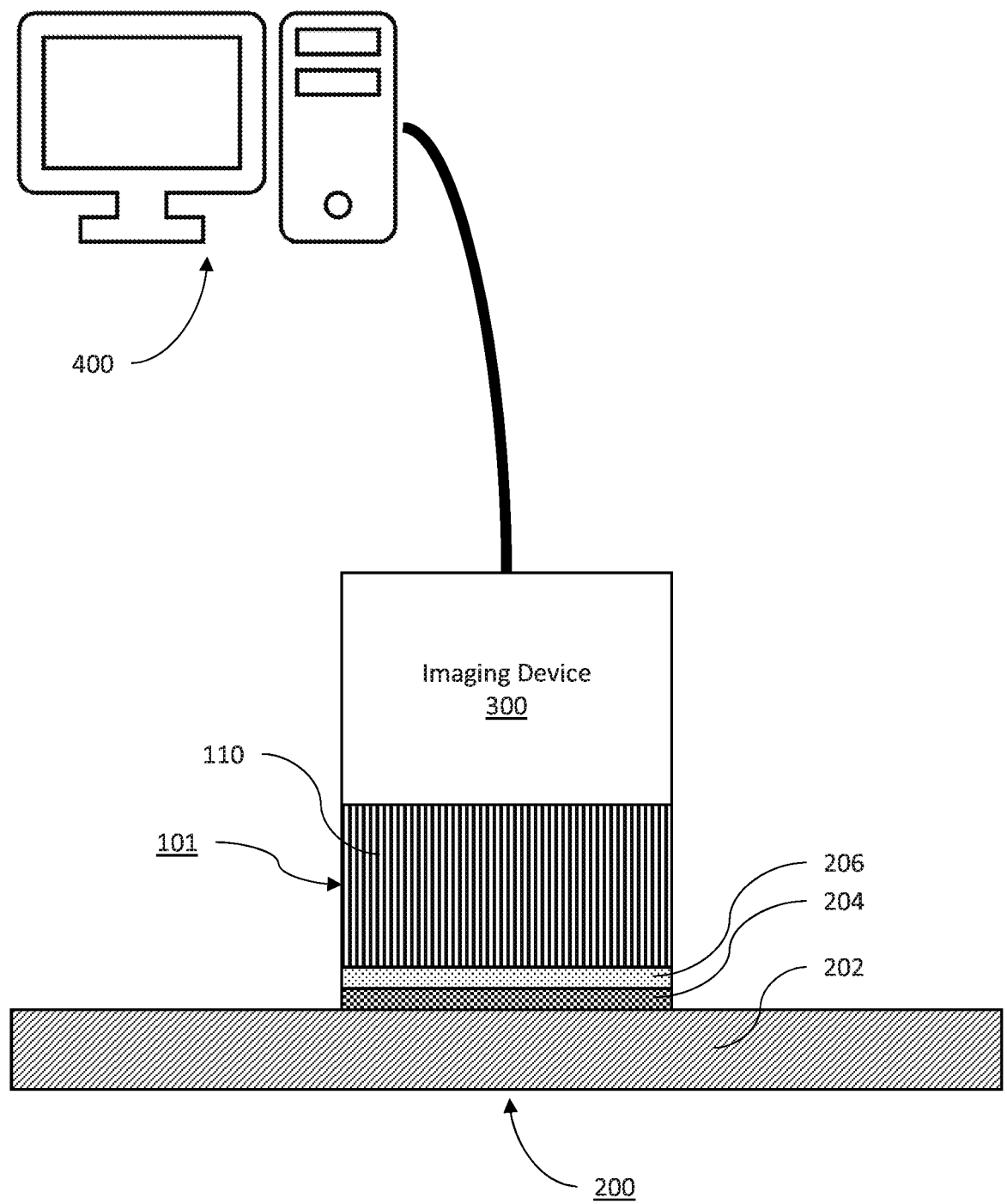
FIG. 10 is a cross-sectional view showing a system for inspecting and analyzing a connection between an optical inspection component and a solder pad of a PCB, in accordance with an embodiment of the present invention.

Referring now to FIG. 10, a cross-sectional view showing a system for inspecting and analyzing a connection between an optical inspection component and a solder pad of a PCB is depicted in accordance with an illustrative embodiment of the present invention.

According to an embodiment of the present invention, the optical inspection component 101 can be attached to a PCB 200 by soldering the optical inspection component 101 to a solder pad 204 with solder 206. The optical inspection component 101 has a vertical orientation such that the optical fibers 104 of the optical inspection component 101 are oriented perpendicular to the solder pad 204. Thus, an exposed end of each optical fiber 104 abuts a layer of solder 206 and is attached to the solder pad 204. An opposite end of each optical fiber 104 is at an opposite of the optical inspection component 101 opposite to the solder 206. Thus, an image of the solder 206 can be communicated through each optical fiber 104 from the solder 206 to the opposite end which is exposed such that conditions of the solder 206 can be viewed.

An imaging device 300 can be used to view the conditions of the solder 206, as communicated through the optical inspection component 101. Because the optical inspection component 101 include a bundle of optical fibers 104, the optical inspection component 101 has a focal length of zero. Thus, a clear image of the solder 206, which is adjacent to ends of the optical fibers 104 of the optical inspection component 101, can be clearly communicated to the imaging device 300.

The imaging device 300 can capture the image using, e.g., a camera including, e.g., a charge couple device (CCD), a microscope or any other image capturing device. The imaging device 300 can be attached directly to the optical inspection component 101. However, the imaging device 300 can also include a part for coupling to the optical inspection component 101, such as, e.g., an intermediate fiber optic cable, an additional lens for adjust magnification, an adapter ring or other adaptation device for connecting the imaging device to the optical inspection component 101, an index matching gel to prevent diffraction of light, or any other device for communicating an image from the optical inspection component 101 to the imaging device 300. The imaging device 300 and/or any intermediate components between the imagine device 300 and the optical inspection component 101, can be attached to the optical inspection component 101 using, e.g., mechanical devices such as, e.g., clamps, vices, screw threads, snap fits, or other mechanical fastening devices, as well as adhesives that are optically transparent such as index matching gels. Additionally, aspects of the present invention include an imaging device 300 that is spaced apart from the optical inspection component 101 to facilitate quick and easy imagining without extra parts or devices.

The imaging device 300 can communicate the captured image to a processing system 400 such that the image of the solder 206 can be analyzed. The processing system 400 can, therefore, include, e.g., a display for displaying the image to a user, a processor for automatically analyzing the solder 206, a memory and/or storage for storing the image, and any other device or component to assist in analyzing the image. The processing system 400 can analyze the image automatically, or the processing system 400 can accept input via, e.g., a keyboard and mouse or touchscreen, from a user viewing the image. Accordingly, the solder 206 can be analyzed for imperfections such as, e.g., voids with a cheap optical imaging device 300 rather than, e.g., an expensive X-ray technique.

However, because the optical inspection component 101 includes multiple optical fibers 104 for communicating the image, the image is segmented according to the arrangement of the optical fibers 104 with each optical fiber 104 communicating a different portion of the image. Moreover, as discussed above, the optical fibers 104 include spaces between each optical fiber 104 due to the shape and arrangement of each of the optical fibers 104. Thus, portions of the solder layer 206 can be missing from the image. Accordingly, processing of the image communicated by the optical inspection component 101 can include an interpolation technique, such as, e.g., nearest-neighbor interpolation, linear interpolation, polynomial interpolation, spline interpolation, bilinear or bicubic interpolation, Gaussian interpolation, or any other suitable technique for interpolating data between each of the optical fibers 104.

To further improve the interpolation of image information in spaces between the optical fibers 104, multiple images can be captured and then combined using, e.g., a spectral image registration or other suitable encoding technique for combining the images. A second interpolation step can then be employed to enhance the image. Thus, the processing system 400 can enhance the resolution of the image by filling in gaps between each of the optical fibers 104 of the optical inspection component 101 to produce a single, high-resolution image of the solder layer 206.

Moreover, the imaging of the solder 206 can be non-destructive because the solder 206 can be re-melted and the optical inspection component 101 removed. Thus, the optical inspection component 101 and the PCB 200 can be cleaned and reused for later analysis or use. Thus, thorough and efficient analysis of solder connections and voids formed in solder connects can be performed to better understand the conditions that cause solder voids.

Referring now to FIG. 11, a block/flow diagram showing a system/method for forming a transparent optical inspection component is depicted in accordance with an illustrative embodiment of the present invention.

At block 1001, bundling optical fibers in a glass tube such that the optical fibers extend longitudinal from a first end of the glass tube to a second end of the glass tube;

At block 1002, filling spaces in the glass tube and the bundle of optical fibers with a solderable powder;

At block 1003, capping each of the first end and the second end with caps;

At block 1004, heating the glass tube, the optical fibers and the solderable powder to a temperature above a melting temperature of the solderable powder to liquify the solderable powder;

At block 1005, cooling the glass tube, the optical fibers and the liquified solderable powder to solidify the solderable powder to form a solderable fill encompassing each of the optical fibers and filling the glass tube such that the solderable fill forms an interface around the optical fibers for soldering one of the first end or the second end of the glass tube to the solder pad; and At block 1006, removing the caps to expose ends of the optical fibers and the solderable fill.

Referring now to FIG. 12, a block/flow diagram showing a system/method inspecting and analyzing a solder layer between an optical inspection component and a PCB is depicted in accordance with an illustrative embodiment of the present invention.

At block 1101, soldering an optical inspection component to a solder pad of a PCB with a layer of solder, the optical inspection component including a plurality of optical fibers longitudinally disposed through a glass tube such that ends of the optical fibers are exposed from corresponding ends of the glass tube and a solderable fill encompassing each of the optical fibers and filling the glass tube such that the solderable fill forms an interface around the optical fibers for soldering one of the ends of the glass tube to a solder pad.

At block 1102, positioning an imaging device over an end of the optical inspection component opposite to the PCB.

At block 1103, capturing images of the layer of solder communicated through the optical fibers of the optical inspection component using the imaging device.

At block 1104, communicating the images to a display.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An optical inspection component for solder void analysis, the optical inspection component comprising:
a plurality of optical fibers longitudinally disposed in a glass tube such that ends of the optical fibers are exposed from corresponding ends of the glass tube;
a solderable fill encompassing each of the optical fibers by filling spaces between each of the optical fibers and between the optical fibers and the glass tube such that the ends of the glass tube include the ends of the optical fibers surrounded by the solderable fill to form an interface around the optical fibers for soldering one of the ends of the glass tube to a solder pad.

2. The optical inspection component as recited in claim 1, wherein the glass tube has a diameter corresponding to an electrical component corresponding to the solder pad.

3. The optical inspection component as recited in claim 1, further including at least one end having a shape to mimic an electrical component corresponding to the solder pad.

4. The optical inspection component as recited in claim 1, wherein the optical fibers include a glass material for communicating optical light.

5. The optical inspection component as recited in claim 1, wherein the solderable fill includes a metal having a melting temperature below a melting temperature of the glass tube and the optical fibers.

6. The optical inspection component as recited in claim 5, wherein the metal includes tin.

7. The optical inspection component as recited in claim 1, wherein the ends of the optical fibers and the interface of the solderable fill are coplanar with one of the ends of the glass tube.

8. An optical inspection component for solder void analysis, the optical inspection component comprising:
the optical inspection component soldered to a solder pad of a printed circuit board with a layer of solder, the optical inspection component including:
a plurality of optical fibers longitudinally disposed through a glass tube such that ends of the optical fibers are exposed from corresponding ends of the glass tube; and
a solderable fill encompassing each of the optical fibers by filling spaces between each of the optical fibers and between the optical fibers and the glass tube such that the ends of the glass tube include the ends of the optical fibers surrounded by the solderable fill to form an interface around the optical fibers for soldering one of the ends of the glass tube to a solder pad; and
an imaging device disposed over an end of the optical inspection component opposite to the solder pad such that the imaging device captures images of the layer of solder communicated through the optical fibers of the optical inspection component.

9. The optical inspection component as recited in claim 8, wherein the glass tube has a diameter corresponding to an electrical component corresponding to the solder pad.

10. The optical inspection component as recited in claim 8, further including at least one end having a shape to mimic an electrical component corresponding to the solder pad.

11. The optical inspection component as recited in claim 8, wherein the optical fibers include a glass material for communicating optical light.

12. The optical inspection component as recited in claim 8, wherein the solderable fill includes a metal having a melting temperature below a melting temperature of the glass tube and the optical fibers.

13. The optical inspection component as recited in claim 12, wherein the metal includes tin.

14. The optical inspection component as recited in claim 8, wherein the ends of the optical fibers and the interface of the solderable fill are coplanar with one of the ends of the glass tube.

15. The optical inspection component as recited in claim 8, further including a display in communication with the imaging device for displaying the captured images of the layer of solder.

16. A method for forming an optical inspection component for solder void analysis, the method comprising:
bundling optical fibers in a glass tube such that the optical fibers extend longitudinal from a first end of the glass tube to a second end of the glass tube;
filling spaces in the glass tube and the bundle of optical fibers with a solderable powder;
capping each of the first end and the second end with caps;
heating the glass tube, the optical fibers and the solderable powder to a temperature above a melting temperature of the solderable powder to liquefy the solderable powder;
cooling the glass tube, the optical fibers and the liquefied solderable powder to solidify the solderable powder to form a solderable fill encompassing each of the optical fibers and filling the glass tube such that the solderable fill forms an interface around the optical fibers for soldering one of the first end or the second end of the glass tube to the solder pad; and
removing the caps to expose ends of the optical fibers and the solderable fill.

17. The method as recited in claim 16, wherein the optical fibers include a glass material for communicating optical light.

18. The method as recited in claim 16, wherein the solderable fill includes a metal having a melting temperature below a melting temperature of the glass tube and the optical fibers.

19. The method as recited in claim 16, wherein exposing the ends of the optical fibers and the interface of the solderable fill includes grinding the first end and the second end of the glass tube until the ends of the optical fibers and the interface of the solderable fill are coplanar with the ends of the glass tube.

20. The method as recited in claim 16, further including drawing the optical inspection component to reduce a size of the glass tube and the optical fibers by heating the glass tube, the optical fibers and the solderable powder to a temperature greater than the melting temperature of the solderable powder and about a same temperature of plasticity of both the optical fibers and the glass tube.

* * * * *